United States Patent [19]
Teranishi et al.

[11] 3,872,011
[45] Mar. 18, 1975

[54] CONDENSED WATER DECHLORINATION APPARATUS

[75] Inventors: Tsugutomo Teranishi; Osami Takita, both of Hitachi, Japan

[73] Assignee: Hitachi, Ltd., Tokyo, Japan

[22] Filed: Dec. 26, 1973

[21] Appl. No.: 427,532

Related U.S. Application Data
[63] Continuation of Ser. No. 190,601, Oct. 19, 1971, abandoned.

[30] Foreign Application Priority Data
Oct. 21, 1970 Japan.................................. 45-92053

[52] U.S. Cl............................. 210/269, 55/194,
[51] Int. Cl............................................ B01d 23/10
[58] Field of Search............... 55/26, 39, 55, 71, 31, 55/194, 387; 202/176; 203/4; 60/DIG. 4, 210/26, 32, 37, 62, 269, 275, Dig. 5

[56] References Cited
UNITED STATES PATENTS
| | | | |
|---|---|---|---|
| 2,689,018 | 9/1954 | Kittredge | 55/39 |
| 2,861,040 | 11/1958 | Buchanan et al. | 55/31 X |
| 3,338,033 | 8/1967 | Ross | 55/164 |
| 3,362,132 | 1/1968 | Schellenberg | 55/194 X |
| 3,420,376 | 1/1969 | Smith | 210/275 X |
| 3,458,440 | 7/1969 | Schmidt | 210/37 X |

FOREIGN PATENTS OR APPLICATIONS
| | | | |
|---|---|---|---|
| 939,977 | 10/1963 | Great Britain | 55/39 |

*Primary Examiner*—Charles N. Hart
*Assistant Examiner*—Robert H. Spitzer
*Attorney, Agent, or Firm*—Craig & Antonelli

[57] ABSTRACT

In a condensed water dechlorination apparatus for a thermal power plant or a nuclear power plant, air is trapped into a dechlorination tower during resin regeneration in the tower, so that boiler corrosion may possibly be enhanced when blow water is directly used. Therefore, a system is additionally provided for introducing the blow water into the steam condenser for the purpose of removing oxygen dissolved in the water.

18 Claims, 1 Drawing Figure

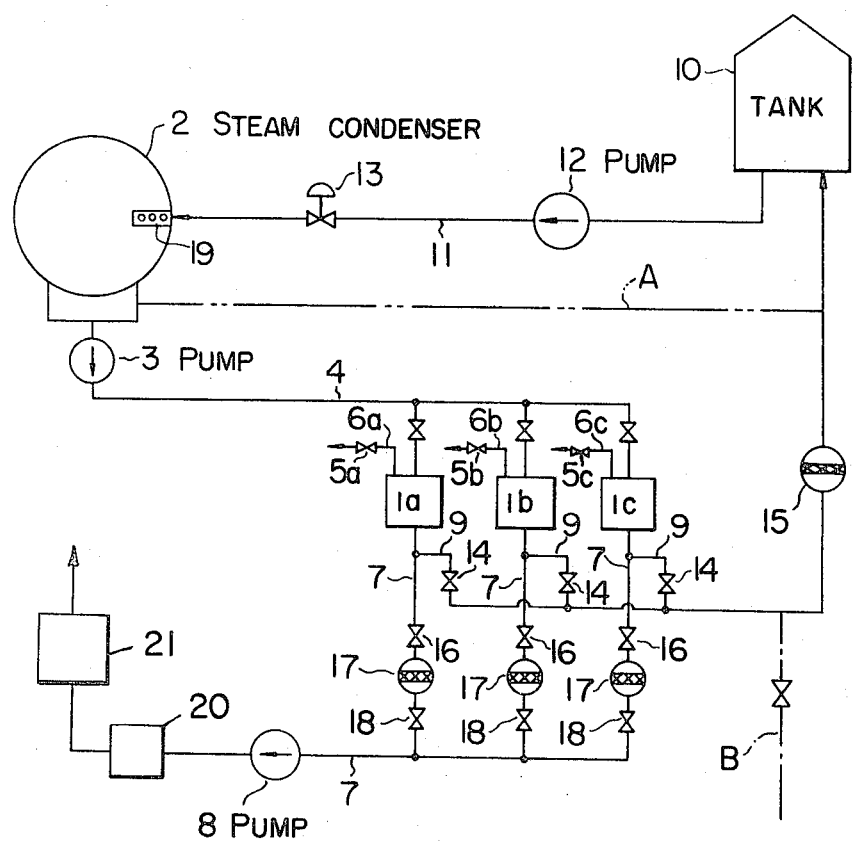

CONDENSED WATER DECHLORINATION APPARATUS

This is a continuation of application Ser. No. 190,601 filed Oct. 19, 1971 now abandoned.

BACKGROUND OF THE INVENTION

In a condensed water dechlorination apparatus for a thermal power plant or a nuclear power plant, the performance of resin in dechlorination towers usually deteriorates with the use of about one week. For this reason, it is usually necessary to regenerate the resin in each of the dechlorination towers periodically, for example, once a week.

The regeneration of the resin is generally performed by transferring the resin from the dechlorination tower to an exterior regeneration tower. In this instance, since the dechlorination tower is aerated, air is trapped therein. After the resin regeneration is completed, the resin is returned to the dechlorination tower which is thereafter filled with water to exhaust the air trapped therein. During this process, a large amount of oxygen is dissolved in the water in the dechlorination tower. If the apparatus is put into operation with this water which contains a large amount of air dissolved therein, the boiler, the nuclear reactor, the heat exchanger and other equipment associated therewith are corroded at a higher rate. In order to remove the dissolved oxygen from the water in a thermal power plant, it has been a usual practice to cause the water to blow out through the outlet port of the dechlorination tower through the action of a forced blow of the condensed water before the apparatus is put into operation, so that the water containing much oxygen is substituted by the water from the steam condenser which contains less oxygen. The blow water has usually been discharged out of the system. Therefore, in a usual plant, several hundred kilograms of pure water must be blown out for each dechlorination tower in each cycle of regeneration until the amount of dissolved oxygen becomes sufficiently small. Thus, the conventional method is accompanied with a lot of economical loss. Further, in a nuclear power plant, the condensed water has intense radioactivity, so that it is impossible to perform the aforementioned forced blow using the condensed water. Moreover, in an arrangement in which waste water is introduced into a waste disposing apparatus, the capacity of the apparatus must be uneconomically large.

The present invention is aimed to eliminate the above problems with a very simple arrangement.

SUMMARY OF THE INVENTION

The present invention relates to a condensed water dechlorination apparatus. According to the present invention, in order to prevent a boiler from being corroded by water which is produced during regeneration of resin in a dechlorination tower and which contains a large amount of oxygen dissolved therein, a system is provided for recycling the blow water to a steam condenser instead of discharging the water outwardly, the dissolved oxygen being removed by a vacuum degassing effect in the steam condenser. A control valve and an auxiliary pump, and optionally an auxiliary tank are also provided in the line from the dechlorination tower to the steam condenser so as to ensure a safe and stable operation. In order to facilitate the vacuum degassing effect in the steam condenser, it may be possible to discharge the blow water through spray nozzle means into the steam condenser.

BRIEF DESCRIPTION OF THE DRAWING

The Drawing shows a circuit diagram of one embodiment in accordance with the present invention.

DESCRIPTION OF THE PREFERRED EMBODIMENT

Referring to the drawing, three dechlorination towers 1a, 1b and 1c are shown connected through a conduit 4 to a steam condensing pump 3 which is in turn connected with a steam condenser 2. This condenser is conventionally maintained at a negative pressure by an evacuator means such as a steam ejector or vacuum pump. The dechlorination towers 1a, 1b and 1c are provided with degassing pipes 6a, 6b and 6c, respectively, which have degassing valves 5a, 5b and 5c, respectively. Water supply conduits 7 connected with the dechlorination towers are in turn connected through a condensed water pressurizing pump 8 and a supply water heater 20 to a boiler 21. A blown pipe 9 is connected with each of the dechlorination towers 1a, 1b and 1c. The blow pipes 9 are connected to a water tank 10 which is in turn connected through a water replenishing pipe 11 to the steam condenser 2. The pipe 11 is provided with a pump 12 and a control valve 13. The valve 13 serves to control the water level in the steam condenser 2. The blow pipes 9 may be connected directly to the intake side of the pump 12. Each of the blow pipes 9 is provided with a blow valve 14 and the line for connecting the pipes 9 to the tank 10 includes a strainer 15. Each of the water supply conduits 7 is provided with a valve 16, a strainer 17 and a second valve 18. The steam condenser 2 is provided with water spray nozzle means 19 which is connected with the pipe 11. In a conventional arrangement, the blow pipes 9 have been so connected that the blow water is discharged out of the system as shown by a phantom line B in the drawing.

According to the arrangement of the present invention, in order to recover the blow water from each of the dechlorination towers 1a, 1b and 1c after the resin is regenerated, the blow valve 14 is opened so as to allow the blow water to flow through the strainer 15 into the tank 10. The water from the tank 10 is passed through the pipe 11 and then through the pump 12, the control valve 13 and the water spray nozzle means 19 into the steam condenser 2. The spray nozzle means 19 has an excellent vacuum degassing effect which is effective to remove the dissolved oxygen.

It has been known to direct the blow water through a conduit A as shown by a chain line in the drawing directly to the steam condenser 2. However, this arrangement has the following disadvantageous features.

1. When the resin is regenerated, the dechlorination towers 1a, 1b and 1c are aerated so that, when the blow valves 14 are accidentally opened in this instance, the air is allowed to enter the steam condenser 2. Thus, the vacuum in the steam condenser 2 is broken and the operation of the whole plant is stopped.

2. The control of water supply into the steam condenser 2 is disturbed resulting in an unstable control.

According to the present invention, it is possible to readily remove the dissolved oxygen in the dechlorination towers after the reproduction of the resin and to eliminate any loss of the blow water. The resin strainer 15 serves to prevent the resin in the dechlorination towers from entering into the steam condenser, and the water spray nozzle means 19 in the steam condenser 2 serves to effectively separate the dissolved oxygen in the blow water.

The present invention has been described with reference to a specific embodiment shown in the drawing, however, it should be understood that the invention can be embodied in other modes without departing from the scope of the appended claims.

We claim:

1. Condensed water dechlorination apparatus comprising:
   a steam condenser maintained at a negative pressure;
   boiler means for producing steam;
   first conduit means for passing water produced in said condenser to said boiler means;
   means for returning steam produced in said boiler means to said steam condenser;
   a water supply tank for supplying make up water to said steam condenser;
   a second conduit means fluidly connecting said supply tank to said steam condenser;
   a pump in said second conduit means for pumping water from said supply tank to said steam condenser;
   a control valve attached to said second conduit means for controlling the flow of water from said supply tank to said steam condenser;
   at least one dechlorination water tower including a quantity of resin which must be periodically withdrawn, regenerated and reinserted into said dechlorination tower to remain effective, said dechlorination tower being attached to said first conduit means intermediate said steam condenser and said boiler;
   a blow pipe fluidly connected to the downstream side of said dechlorination water tower and in fluid communication with said second conduit upstream of said pump and control valve for passing blow water produced in said dechlorination water tower immediately after regeneration and replacement of said resin therein to said second conduit;
   and valve means fluidly connected to said dechlorination water tower for causing the water passing out of said dechlorination water tower to pass through said first conduit means and into said boiler during normal operation of said apparatus and for further causing the water passing out of said dechlorination water tower to pass through said blow pipe immediately after the regenerated resin is reinserted into said dechlorination water tower.

2. The condensed water dechlorination apparatus of claim 1, wherein said condenser is provided with a nozzle means for spraying blow water returning through said supply pipe into said condenser.

3. The condensed water dechlorination apparatus of claim 1, wherein a resin strainer is provided in said blow pipe.

4. The condensed water dechlorination apparatus of claim 1, wherein said blow pipe is fluidly connected to said water supply tank.

5. The condensed water dechlorination apparatus of claim 1, further comprising a pump attached to said first conduit downstream of said dechlorination water tower.

6. The condensed water dechlorination apparatus of claim 1, further comprising a resin strainer in said first conduit downstream of said dechlorination water tower.

7. The condensed water dechlorination apparatus of claim 1, including a plurality of dechlorination water towers connected in parallel to said first conduit.

8. The condensed water dechlorination apparatus of claim 1, including three dechlorination water towers.

9. The condensed water dechlorination apparatus of claim 1, wherein said blow pipe is attached to said first conduit downstream of said dechlorination water tower.

10. The condensed water dechlorination apparatus of claim 9, wherein said valve means includes a first valve attached to said blow pipe and a second valve attached to said first conduit downstream of the point where said blow pipe is attached to said conduit.

11. In a condensed water dechlorination apparatus including at least one dechlorination water tower having a resin therein which must be periodically regenerated, means for passing condensed water from a steam condenser to a boiler attached to said dechlorination water tower, a blow pipe for discharging water out of said dechlorination tower and a make up water storage tank connected via a conduit means to said steam condenser; means for recirculating the flow water produced upon regeneration of said resin without interrupting the operation of said steam condenser comprising means fluidly connecting said blow pipe with said steam condenser, and control means in said connecting means for controlling the flow of fluids therethrough.

12. The condensed water dechlorination apparatus according to claim 11, further including pump means attached to said connecting means.

13. The condensed water dechlorination apparatus of claim 11, wherein said connecting means is fluidly connected with said water supply tank.

14. A condensed water dechlorination apparatus comprising: a steam condenser; at least one dechlorination water tower which periodically produces blow water attached to said steam condenser; connecting means fluidly connecting the outlet of said at least one dechlorination water tower with said steam condenser so that blow water produced in said dechlorination water tower can be recycled to said steam condenser; and control means for controlling the flow of fluid through said connecting means, said control means allowing blow water to flow from said dechlorination water tower to said steam condenser but preventing the breakdown of the vacuum in said steam condenser.

15. The condensed water dechlorination tower of claim 14, wherein said control means includes pump means attached to said connecting means.

16. The condensed water dechlorination apparatus of claim 14, wherein said control means includes a water supply tank connected to said connecting means.

17. The condensed water dechlorination apparatus of claim 14, further including a boiler and second connecting means connecting the outlet of said at least one dechlorination tower with said boiler.

18. The condensed water dechlorination apparatus of claim 17, further including valve means in fluid communication with the outlet of said at least one dechlorination water tower for alternately passing the water passing out of said dechlorination tower to said connecting means and said second connecting means.

* * * * *